Feb. 17, 1970
R. A. KAENEL
3,496,301
TIME DIVISION CONCENTRATOR WITH REDUCED STATION SCANNING INTERVAL
Filed April 19, 1966
6 Sheets-Sheet 1

INVENTOR
R. A. KAENEL
BY R. C. Winter
ATTORNEY

Feb. 17, 1970 R. A. KAENEL 3,496,301

TIME DIVISION CONCENTRATOR WITH REDUCED STATION SCANNING INTERVAL

Filed April 19, 1966 6 Sheets-Sheet 2

Feb. 17, 1970 R. A. KAENEL 3,496,301

TIME DIVISION CONCENTRATOR WITH REDUCED STATION SCANNING INTERVAL

Filed April 19, 1966 6 Sheets-Sheet 3

Feb. 17, 1970 R. A. KAENEL 3,496,301

TIME DIVISION CONCENTRATOR WITH REDUCED STATION SCANNING INTERVAL

Filed April 19, 1966 6 Sheets-Sheet 5

United States Patent Office 3,496,301

Patented Feb. 17, 1970

3,496,301

TIME DIVISION CONCENTRATOR WITH REDUCED STATION SCANNING INTERVAL

Reginald A. Kaenel, Chatham, N.J., assignor to Bell Telephone Laboratories, Incorporated, New York, N.Y., a corporation of New York Filed Apr. 19, 1966, Ser. No. 543,699
Int. Cl. H04j *3/00;* H04m *3/00*
U.S. Cl. 179—15 22 Claims

ABSTRACT OF THE DISCLOSURE

In a time division multiplex communication system, more than two stations generate signal samples during each repetitive cycle of operation and all of these samples are transferred simultaneously to and from a common bus through which selected ones of the samples are transmitted together with the designation of a station requesting service.

Figure 1:
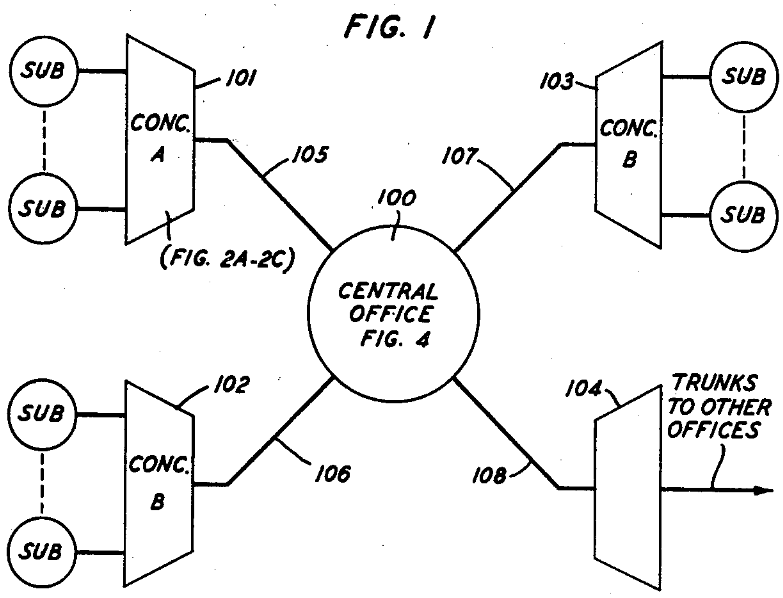

This invention relates to communication systems and more particularly to telephone systems having stations grouped in localities remote from a central office.

In recent years, a number of telephone systems have been proposed which reduce plant costs by concentrating remote subscriber lines in groups and connecting them to a central office by a lesser number of trunks. System interconnections currently are of two general types; viz., space separation involving space division switching and time separation involving time division switching. In the former type, each connection through the system between a calling and a called line or between a calling line and an interoffice trunk is a unique path defined by various switching elements. Thus privacy of conversations is assured by the separation of individual conversations in space. In the latter type, a number of line interconnections share a common path, with privacy of conversation assured by separation of individual conversations in time.

A system employing space separation with remote line concentration is disclosed, for example, in E. Bruce–W. A. Reenstra–W. J. Ritchie Patent 2,976,367 issued Mar. 21, 1961, and a system employing time separation with remote line concentration is disclosed, for example, in D. B. James–J. D. Johannesen–M. Karnaugh–W. A. Malthaner Patent 2,957,949 issued Oct. 25, 1960. These systems obtained the desired economies by retaining a majority of the control equipment at the central office and by reducing the amount of transmission equipment required between the central office and the remote concentrators.

Time separation, of course, provides an advantage over space separation in its ability to reduce transmission facilities to a single path shared in time by utilizing inexpensive gating circuits. However, the facilities required at the remote line concentrator to switch voice and control information over the common path normally are more complex. Also the blockage of potential line interconnections in time separation systems presents a peculiar problem which is aggravated by the expansion of such systems to encompass several central offices each terminating a plurality of remote concentrators. The latter problem is solved in a manner disclosed in H. Inose–Y. Kawai–Z. Koono–M. Takagi–Y. Yasuda–Y. Yoshida Patent 3,223,784 issued Dec. 14, 1965 in which each telephone line includes its own coding and decoding facilities. Of course this increased per line complexity reduces the otherwise striking economies realized with this system approach.

Accordingly, it is a general object of this invention to provide an improved communication system employing time separation techniques.

It is another object of this invention to provide a more flexible and economical line concentrator in a time separation telephone system.

It is a further object of this invention to simplify the circuitry required at the remote concentrator to terminate lines employing individual coding and decoding equipment.

These and other objects of this invention are attained in one specific illustrative embodiment wherein a time separation telephone system comprises distinct groups of telephone lines remote from one another and connnected through corresponding switching networks, referred to as line concentrators, to a common control center or central office, essentially in the manner described in the aforementioned Inose et al. patent. The line circuit employs delta modulation techniques which permit supervision over the same path between remote concentrator and central office as carries the voice signals.

The line concentrator equipment employed in the instant embodiment takes full advantage of the available delta modulation equipment in measurably reducing the quantity of concentrator switching equipment, while at the same time increasing its flexibility. These advantages derive from the employment of information storage devices, referred to as domain wall registers, as disclosed, for example, in U. F. Gianola–R. A. Kaenel–H. E. D. Scovil Patent 3,430,001, issued Feb. 25, 1969. These devices are arranged to accept and process digital information as received from the delta modulators in the telephone lines.

Whereas in the arrangement disclosed by Inose et al. each active telephone line is sampled once per office cycle, my arrangement samples every line terminating on the remote concentrator simultaneously during a distinct interval occurring once in each office cycle. The balance of the office cycle is utilized to transmit samples derived only from active lines in corresponding assigned time slots to the central office for subsequent transmission to their respective destinations.

Similarly, all telephone lines terminating on the concentrator are scanned simultaneously to detect the current supervisory state, and the scan results are stored and processed in circuitry at the remote concentrator operating independently of the central office. When a change in the activity status of a particular line is detected by the scanning equipment, a complete designation of that line, together with an indication of the type of change in line condition, is transmitted to the central office, along with the coded voice samples. Thus the central office is required only to assign idle time slots or erase previous assignments, as directed by information received from a remote concentrator.

A complete record of line assignments is maintained at the remote concentrator by utilization of another domain wall device designated the activity register. Such a register circulates an activity status indication for each telephone line terminating on the concentrator. This activity status is changed upon receipt of each designation from a central office by comparison with the corresponding line number. The activity register also serves to permit the transmission of information to and from the central office only for active lines.

Advantage is taken of the simplicity of the devices involved in this arrangement to connect small groups of telephone lines in parallel for transmission of information over a single common bus. Similarly, a single sample may be taken from each line during the sampling interval of each office cycle or several input registers may be connected in parallel to take a plurality of samples from each telephone line during the sampling interval of each office cycle. With this flexibility, the severe timing requirements for transmission of delta modulated signals through a time division multiplex system are readily met.

It is a feature of this invention that in a system employing time division multiplex techniques, information samples be taken simultaneously from a plurality of telephone lines connectable to a common bus.

It is another feature of this invention that scanning circuitry at a remote concentrator scan all telephone lines simultaneously to determine their supervisory status.

It is a further feature of this invention that a change of status indication, together with the complete designation of a telephone line indicating such a change in status, be directed from the remote concentrator to the central office along a path followed by coded voice signals.

It is a still further feature of this invention that an activity register at the remote concentrator permit samples taken only from active ones of the telephone lines terminating on the line concentrator to be transmitted to the central office.

It is still another feature of this invention that the activity register be changed in accordance with information developed by the scanning circuitry.

It is yet another feature of this invention that information samples received from the central office in one office cycle be directed simultaneously to the corresponding telephone lines in response to activity indications in corresponding positions of the activity register.

Figure 4:
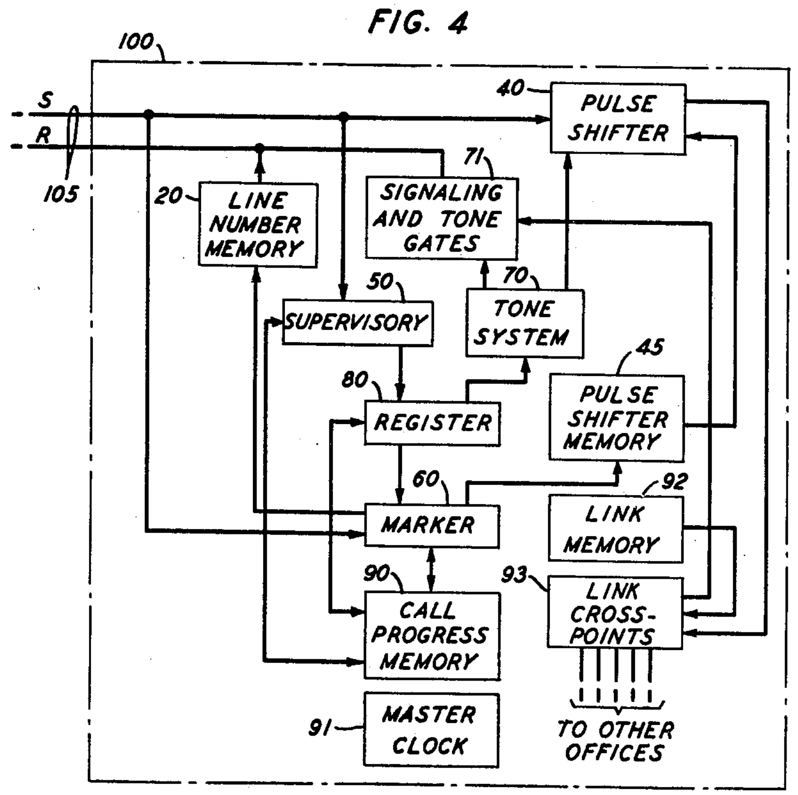
Figure 2A:
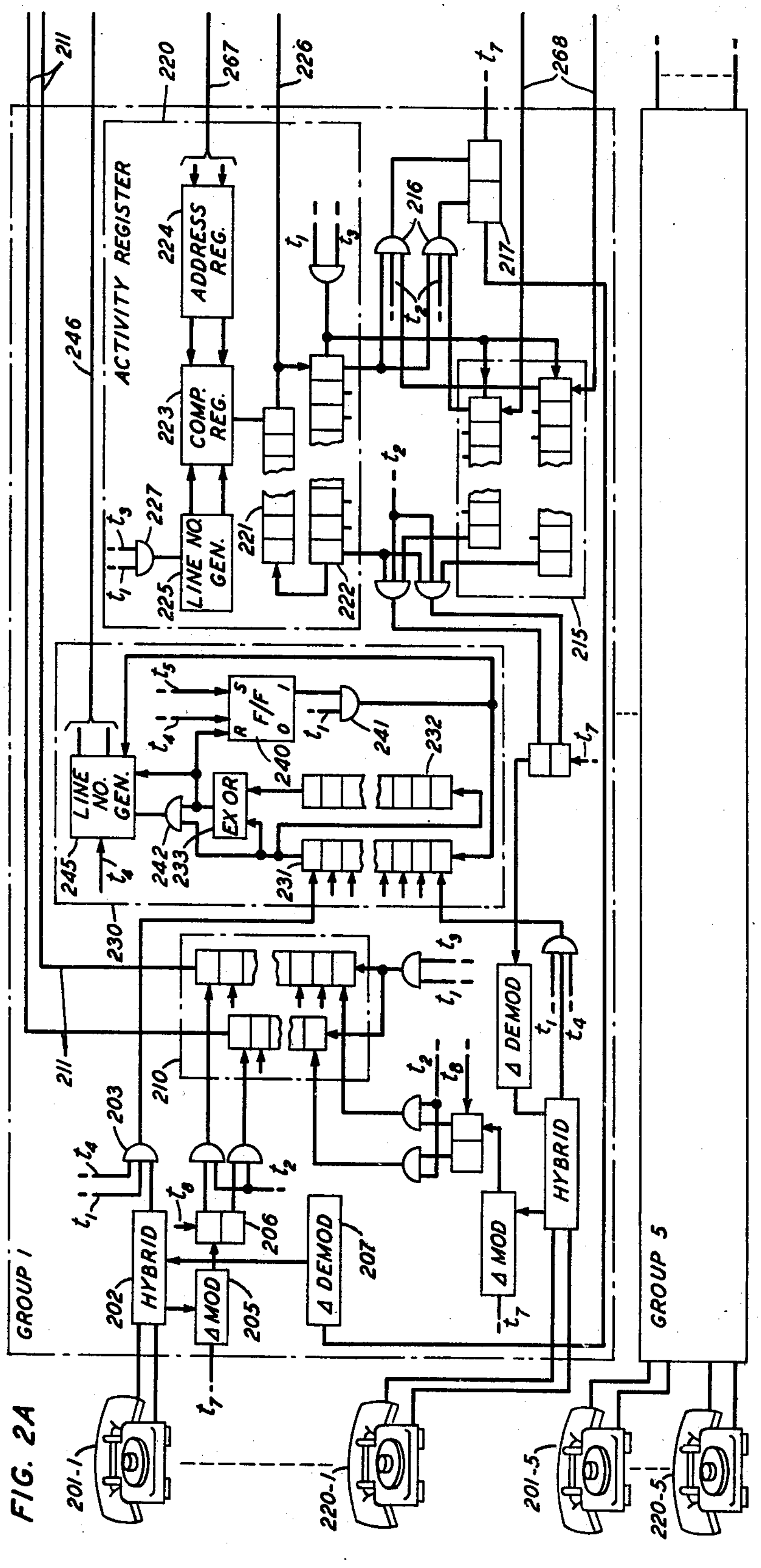
Figure 2B:
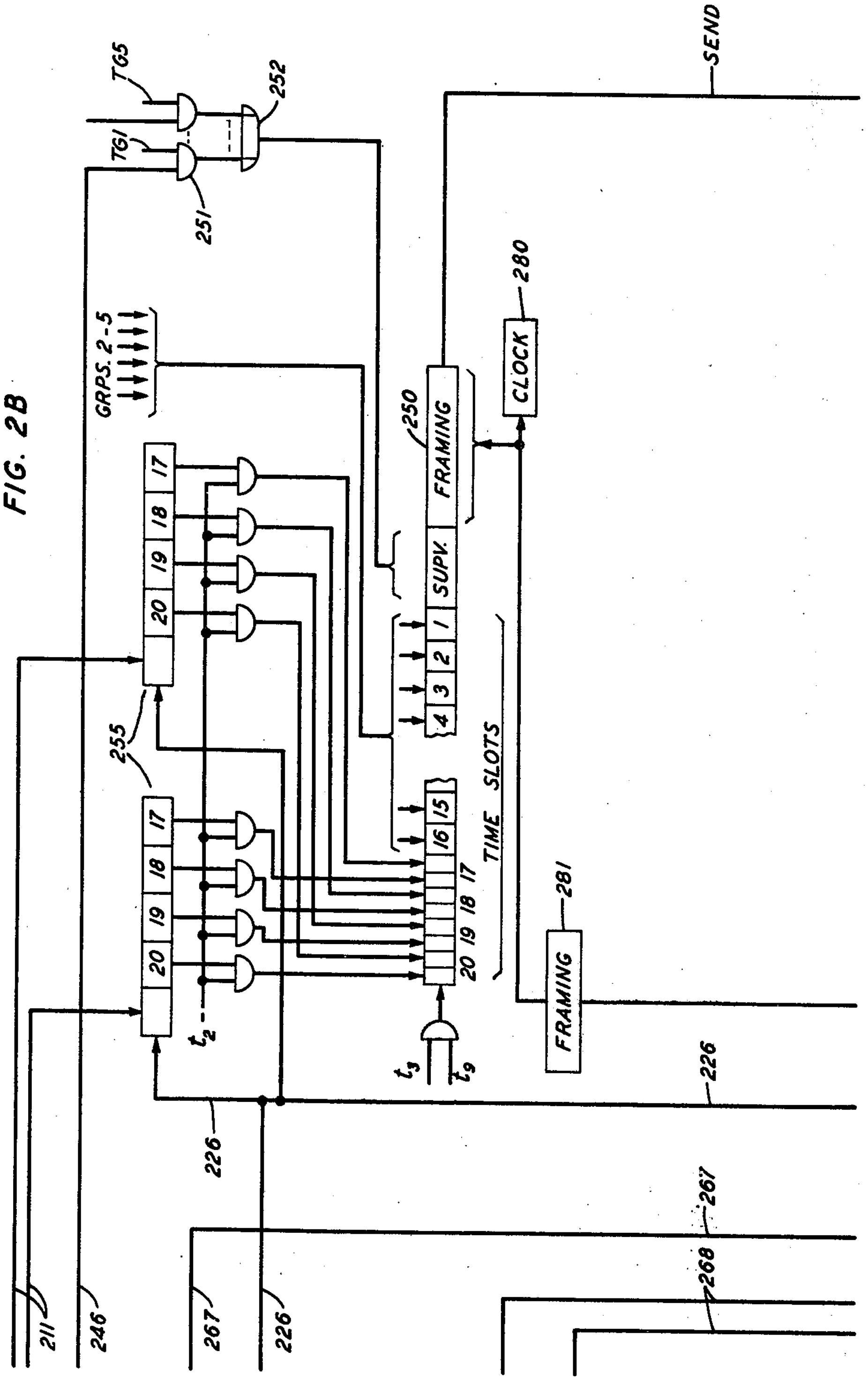
Figures 2C, 6:
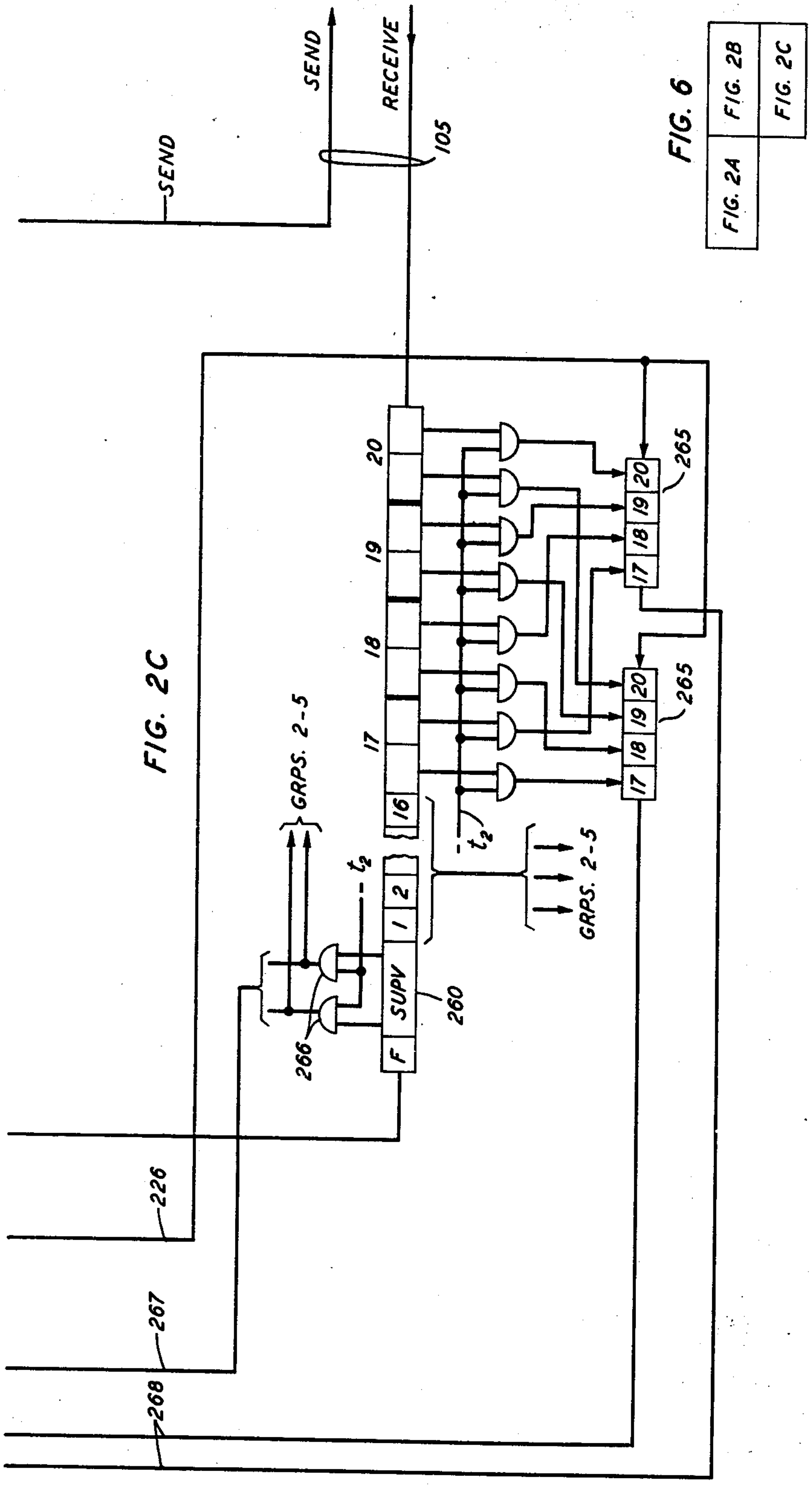
Figure 3:
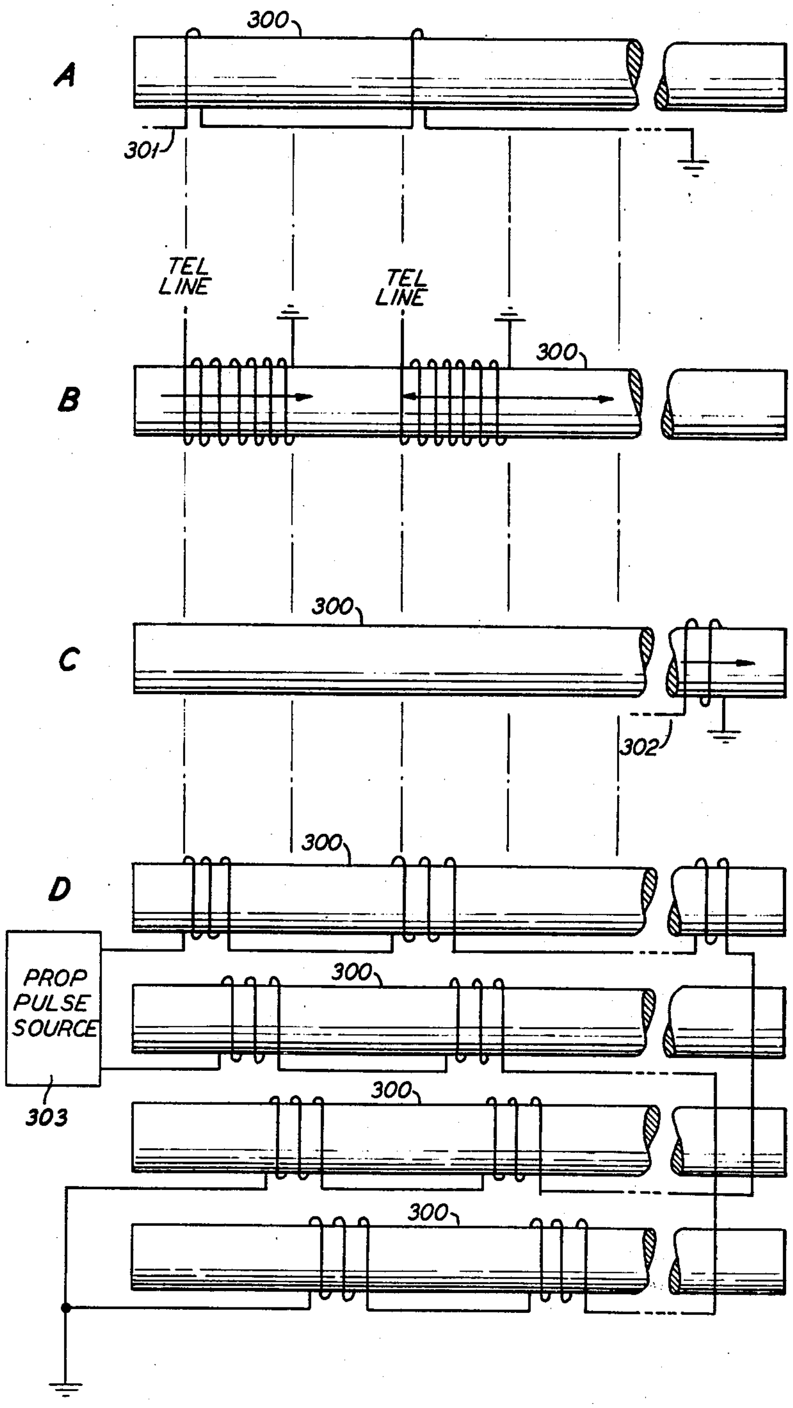
Figure 5:
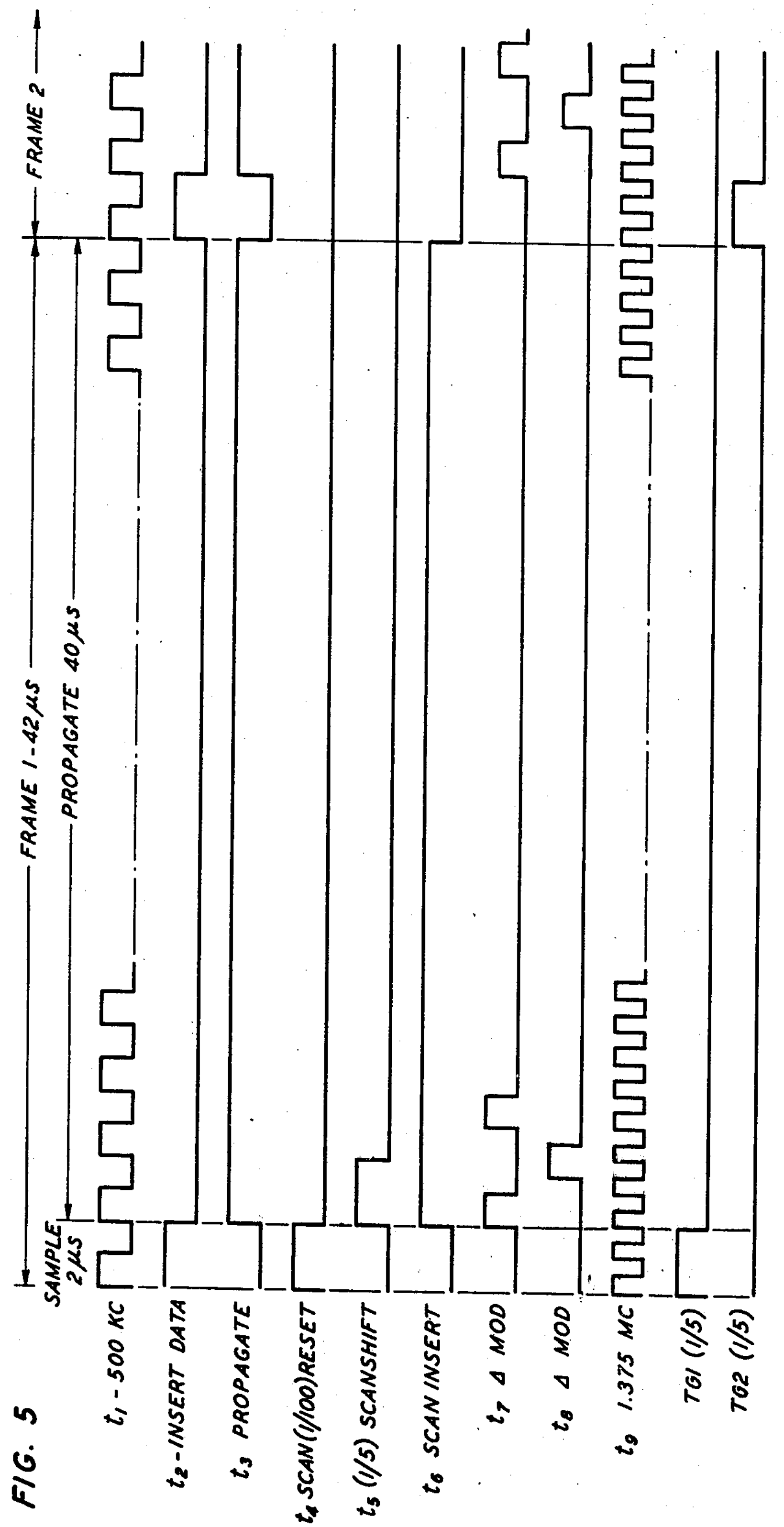

A complete understanding of this invention and of these and various other features thereof may be gained from consideration of the following detailed description and the accompanying drawing, in which:

FIG. 1 is a block diagram representation of a telephone system comprising a central office, a plurality of remote concentrators connected to the central office and a plurality of subscriber lines or trunks to other telephone offices connected to each of the remote concentrators;

FIGS. 2A, 2B and 2C form a representation, substantially in block diagram form, of the particular facilities available in each of the remote concentrators of one illustrative embodiment of my invention, the manner of their interconnection being indicated in the Key Chart of FIG. 6;

FIGS. 3, 3A, B, C and D form a schematic representation of a device utilized in the remote concentrator of the embodiment of my invention depicted in FIG. 2A;

FIG. 4 is a representation in block diagram form of the facilities available in the central office to serve one of the remote concentrators; and FIG. 5 is a time chart of one office cycle in the control of a remote concentrator.

Turning now to the drawing, the telephone system depicted in FIG. 1 is similar to that disclosed in the aforementioned Inose et al. patent, which will be described in general terms hereinafter to provide a basis for the detailed description of the improvements realized in accordance with this invention and depicted in FIGS. 2A–2C.

SYSTEM

In FIG. 1 the telephone system comprises remote concentrators 101, 102, and 103 and interoffice trunk facilities 104, each connected via corresponding transmission buses 105 through 108 to the common control equipment at central office 100. The remote concentrators are so named because of the connection thereto of a plurality of individual telephone subscriber lines concentrated in the same remote area. Each interconcentrator and intraconcentrator connection, as well as the connections between a concentrator and a foreign exchange, are completed through central office 100 via the appropriate common bus or buses 105–108.

The central office 100 assigns to a calling line a particular time slot in a recurring cycle of time slots during which time information from the calling and called lines is transferred through the appropriated bus or buses 105–108. Similarly, other telephone connections are assigned distinct time slots in the recurrent cycle of time slots such that the various channels are shared in time by the active telephone calls which in turn are separated in time. A considerable saving in telephone cable is one beneficial result.

Operation of the central office as described in the aforementioned Inose et al. system utilizes time slot transposition to overcome the blocking problem encountered in systems which fail to locate a common idle time slot. Thus a subscriber line terminating on concentrator 101, in requesting a connection to a subscriber line terminating on concentrator 103, may be assigned a first time slot by central office 100, while the subscriber line terminating on concentrator 103 may be assigned a second time slot. Information from the calling line is then transposed in central office 100 from the first to the second time slot for transmission to the called line and vice versa.

The particular equipment required in central office 100 to perform all of the tasks required in establishing a call connection in the system of FIG. 1 and to perform the time slot transposition is illustrated in FIG. 4 and is described in detail in the aforementioned Inose et al. patent. As this control facility does not constitute any portion of the instant invention, it is only referred to hereinafter with regard to modifications in components and their interconnection in order to make the central office operation compatible with the remote concentrator equipment which does comprise the novel aspects of this disclosure. Suffice it to say at this point that information received in central office 100 from a concentrator is in a proper form for use by the equipment disclosed in the aforementioned Inose et al. patent and, similarly, information received at a concentrator from central office 100 is in the same form as that generated in accordance with the Inose et al. patent.

In order to establish a connection between two subscribers, the system first detects a request for service through a continual scanning process involving components at the remote concentrators to be described later in connection with the novel aspects of this disclosure. Marker 60, FIG. 4, is provided at central office 100 for the purpose of identifying requests for service.

In the Inose et al. patent, a distinct control path conveys the identity of lines requesting service from the remote concentrator to marker 60. My system transmits such line identities over the send path S of common bus 105 during a distinct supervisory interval in repetitive frames. Thus the only variation from the Inose et al. arrangement at the central office involves a simple timing operation to permit gating of the supervisory portion of each arriving frame of information from the send path S to marker 60. Similarly, the output of line number memory 20, which is directed to the remote concentrator via the control path in the Inose et al. patent, is transmitted via the receive path R of common bus 105 in my arrangement. In this instance the line numbers are gated to the receive path R so as to occupy the supervisory portion of each departing frame of information.

Upon receiving an indication from concentrator 101 that a telephone is in the off-hook or active state, marker 60 signals line number memory 20 to determine whether the designation of the scanned line is recorded therein, indicating that it is busy. If the line was previously on-hook, marker 60 assigns an idle time slot, and the line designation is recorded in line number memory 20 in the assigned time slot. Thus line number memory 20 keeps track of all active lines in the system, as well as the time slots assigned to each one.

Call progress memory 90 causes register 80 to be engaged preparatory to the receipt of the called party's identifying digits. Upon seizure of register 80, a signal is transmitted to tone system 70 which thereupon begins transmitting a coded tone through gates 71 and the receive path R of common bus 105 to concentrator 101, which tone serves to alert the calling line to begin transmitting the characteristic digits of the called line. These dial pulse signals are transmitted over the send path S of common bus 105.

Supervisory circuit 50 detects all signals transmitted to the central office over the send path S and distinguishes between such signals and the voice signals also transmitted over the send path. Upon detecting the digits identifying the called line, supervisory circuit 50 delivers such indicia to the previously engaged register 80. As soon after registration as the busy test equipment is available, the condition of the called line will be investigated, and if it is found to be idle, register 80 will transmit the stored digits to marker 60. The marker thereupon controls the assignment of an idle time slot to the called line in conjunction with line number memory 20.

With both the calling and called lines assigned respective time slots, marker 60 transmits these assignments to pulse shifter memory 45. Memory 45 in turn counts the number of time slots between the time slot assigned to the called line and that assigned to the calling line and stores an indication of the difference between the respective time slots. The stored information is read out during each office cycle and serves to enable gates in pulse shifter 40. In this fashion information received in pulse shifter 40 from one subscriber via the corresponding send path is delayed until the appearance of the time slot assigned to the other subscriber line in the active pair, at which time the information is gated out of pulse shifter 40 and transmitted to the designated line.

OFFICE TIMING

In order to assist in understanding the detailed operation of this system, it will be necessary to consider the particular timing involved and for this purpose a specific timing sequence, as illustrated in FIG. 5, will be described.

The basic criterion in any time division multiplex system is that samples must be taken at a rate at least twice that of the highest frequency signal to be transmitted in order to permit proper reconstruction of the signal at the receiving terminal. Thus, for voice transmission, an eight kilocycle sampling rate is an acceptable minimum. The employment of delta modulation places a further restriction on such systems, with about six times the minimum sampling rate being required for proper reconstruction of the coded signal sample. The information stored in the remote concentrator can be propagated at a half megacycle rate, or a one position shift through the various domain wall registers in a two microsecond interval. This bit shift rate provides a second criterion for processing information in the instant system.

Thus consider that 100 subscriber lines terminate on remote concentrator 101 and that twenty time slots $S_1$, $S_2$ . . . $S_{20}$ are available and deemed sufficient to handle the traffic requirements for this capacity. The twenty time slots will appear in a repetitive cycle F, referred to as a frame. It will be noted hereinafter that the samples taken simultaneously from each of the lines must be propagated serially during each frame. Thus in order to propagate 100 samples at the half megacycle bit shift rate would require a 200 microsecond frame. However, the resultant sampling rate would then be only five kilocycles or one tenth of the requisite level established by the first criteria. Contrarily, in order to satisfy the requisite fifty kilocycle sampling rate with this arrangement, a twenty microsecond frame and a bit shift rate of five megacycles would be required. Such a bit shift rate would be difficult to attain with currently available domain wall devices.

It appears from the foregoing that a remote concentrator having 100 lines served by twenty time slots cannot be operated so as to satisfy the two basic criteria. However, the considerable flexibility of domain wall devices permits their arrangement in accordance with this invention so that both criteria can be readily satisfied. Thus instead of sampling each line only once per frame, a number of samples may be taken and inserted simultaneously in separate input registers. With this approach the bit shift rate remains constant while the sampling rate is increased. In the previous example in which a fifty kilocycle bit rate and a 200 microsecond frame for 100 lines resulted in a five kilocycle sampling rate, ten simultaneous samples per line would raise this sampling rate to a satisfactory fifty kilocycle level.

Another approach would be to divide the 100 lines into distinct groups and to assign a suitable number of the twenty time slots to each group. With this arrangement the sampling rate remains constant while the bit shift rate is increased. Again, in the previous example, with a fifty kilocycle sampling rate and the consequent twenty microsecond frame, the division of the 100 lines into ten distinct groups would reduce the bit shift rate to a satisfactory 500 kilocycle level.

A combination of these two approaches would appear to provide an optimum arrangement. Thus in accordance with this illustrative embodiment, the 100 lines are arranged in five groups of twenty lines each. Two samples per frame are taken from each line and stored into two identical sections of the data input register, resulting in a forty-two microsecond frame which allows two microseconds for sampling and forty microseconds for propagation. This arrangement provides a satisfactory forty-eight kilocycle sampling rate and a 500 kilocycle bit shift rate.

In addition to information signal samples, supervisory signals indicating changes in telephone line conditions and framing signals assuring continuity with the precise timing of frame intervals established at the central office, are inserted at the remote concentrator prior to transmission of each frame of information signal samples to the central office. This operation is readily accomplished without altering the basic frame length merely by increasing the bit shift rate for transmission between the remote concentrator and central office above the level required for sampling and processing in the remote concentrator. The bit shift rate is then restored to its orignal level for processing at the destination.

Consider, for example, that seven bits are required to identify each of the 100 telephone lines and one bit to identify the manner in which a telephone line has changed its supervisory state and that seven bits are required for framing. These fifteen bits must then be added to the forty information bits available in each frame; i.e., two bits in each of twenty time slots, and the total of fifty-five bits shifted to the send path of the common bus in the available forty microsecond shift interval. This would require that the bit shift rate be increased to 1.375 megacycles, a level which can be readily accomplished with equipment available in the art.

The timing chart on FIG. 5 is based upon the cited example of a 100 line remote concentrator served by twenty time slots and divided into five groups of twenty lines each. Thus $t_1$ represents the 500 kilocycle bit shift rate, $t_2$ the two microsecond sampling interval in which two information samples are taken from each line and stored in separate data input registers, and $t_3$ the propagate interval in which information stored in each data input register of each twenty line group is shifted out at the $t_1$ bit shift rate and which consumes the balance of the forty-two microsecond frame. The other timing intervals designated in FIG. 5 will be described in conjunction with the system operation hereinafter.

The various gates and other system components are controlled by precisely timed signal pulses so as to transfer information between the calling and called lines through central office 100 in the preassigned time slots. Timing within a frame is established by a common clock pulse source at central office 100 designated master clock 91 in FIG. 4. This pulse source serves all concentrators and all office control equipment to maintain proper synchronism and to perform all timing operations.

Slave clock 280, FIG. 2B, provides the timing signals necessary for operation of all components in concentrator 101 and is kept in step with the central office by framing circuit 281. With the ability to transmit and receive several framing bits in each frame, the task of maintaining proper framing at the concentrator is straightforward and may, for example, take the general form disclosed in the aforementioned James et al. patent.

With delta modulation, as employed herein, the same binary digit is transmitted a maximum number of times in succession to represent the rise time of the highest frequency signal to be transmitted. Similarly, the opposite binary digit is transmitted a maximum number of times in succession to represent the fall time of the highest frequency signal to be transmitted by an active line. Considering then that a four kilocycle signal is the maximum, three samples of the same binary digit type is all that will be taken in succession at a forty-eight kilocycle sampling rate. Thus a unique framing signal may comprise four or more consecutive digits of the same binary type without conflict with coded speech signals being transmitted.

Since a binary zero is transmitted continuously to represent a telephone on-hook, a binary one is utilized for framing. Thus five consecutive ones may be chosen as the framing code. Since this also represents the binary number 16, this number is not utilized for a line assignment. Now when framing circuit 281 receives five consecutive ones from the receive path of bus 105, its signals clock 280 to provide the $t_2$ signal. It also inserts the framing code in transmission register 250 for transmission over the send path in the next frame. Framing thus is accomplished in each frame interval.

Before describing the operation of the remote concentrator in detail, it may be of asistance to consider the specific elements which make up the major components illustrated in block form in FIGS. 2A–2C. As indicated, in this example concentrator 101 terminates five distinct twenty line groups and two samples are taken from each line in each frame.

TELEPHONE LINE CIRCUIT

The line circuit for telephone 201–1, FIG. 2A, which is the same as that for each of the 100 telephones terminating on concentrator 101, comprises the usual hybrid circuit 202 which performs the conversion from the two-wire subscriber line to the four-wire common bus 105. Outgoing speech and supervisory signals are stored at the output of hybrid 202 such that upon receipt of a timing signal at a coding circuit, advantageously delta modulator 205, a signal sample will be coded and transferred to data input register 210 via a short shift register 206 to be considered later.

Coding circuit 205 in this instance converts the input voice and supervisory signals to output pulse code signals by virtue of a delta modulation process known in the art and described in some detail in the aforementioned Inose et al. patent. In this instance the delta modulator is arranged so as to provide a particular output signal; e.g., a series of zeros to indicate an inactive or on-hook telephone station. If the telephone is active or off-hook but not transmitting information, the delta modulator will provide a second distinct output; e.g., alternate ones and zeros. Finally, if the telephone is off-hook and information is being transmitted, the delta modulator will provide combination output signals following the amplitude of the input signal; e.g., a series of ones may indicate a continually rising amplitude and a series of zeros a continually decreasing amplitude. This particular code pattern is required for proper detection at central office 100 in the system according to the aforementioned Inose et al. patent.

Coded information received from central office 100 over the receive path of common bus 105, and being directed to telephone 201–1, is first stored in data output register 215 from which it is subsequently gated; e.g., through AND gate 216 and short shift register 217 to delta demodulator 207. Upon receipt of the appropriate timing signal, demodulator 207 converts the coded signals to speech signals which are amplified and transmitted through hybrid circuit 202 to telephone 201–1.

DOMAIN WALL PROPAGATION REGISTERS

The various registers employed in line concentrator 101, with the exception of transmission registers 250 and 260, FIGS. 2B and 2C, advantageously are of a type utilizing domain wall propagation, which is now well known in the art; registers 250 and 260 advantageously are shift registers of known design, such as employed in the James et al. system. An understanding of the basic structure and operation of domain wall propagation registers will be helpful to an appreciation of the concentrator 101 operation; accordingly, a portion of one of such register is illustrated in FIG. 3, a more detailed description being found in my application Ser. No. 515,897, filed Dec. 23, 1964. It comprises an elongated magnetic wire 300, shown in seven distinct views for ease of understanding the relationship between the various windings thereon. Thus in FIG. 3A a narrow electrical conductor 301 is coupled to wire 300 at spaced-apart positions. Conductor 301 is connected between a driver and ground. The driver may be associated with local clock 280, FIG. 2B. As noted in FIG. 3B, input signals, which in regard to data input register 210 are received from the corresponding telephone lines, are coupled to magnetic wire 300 adjacent the couplings of driver conductor 301. A sense conductor 302, FIG. 3C, which is also coupled to magnetic wire 300, is connected between a utilization circuit and ground.

The magnetic wire 300 is itself wrapped helically about an elongated nonmagnetic mandrel of core. Two propagation conductors are arranged in relation to wire 300, generally as shown in FIG. 3D, such that pulses applied alternately thereto from source 303 will step a reverse magnetic domain of stable length along wire 300. Such propagation conductors and their positioning in relation to the mandrel in order to accomplish this stepping action are well known in the art.

The magnetic wire for domain wall propagation registers typically comprises a ferromagnetic material having a reentrant, substantially rectangular, hysteresis, characteristic. Such materials exhibit a stable flux state called a reverse domain when a field in excess of a predetermined coercive force is applied through one of the input lines over a wire segment of sufficient length. A reverse domain is indicated by the arrow directed to the left in wire 300 in FIG. 3. The normal condition of the wire 300 is indicated by arrows directed to the right in FIG. 3. Once a reverse domain is established, it may be propagated along magnetic wire 300 by a relatively low amplitude, polyphase, propagation field generated by pulses applied to the propagation conductors. Propagation along wire 300 is toward sense conductor 302 which then provides an output pulse for each domain wall arriving thereat.

Conductor 301 is pulsed periodically to establish the desired domains in wire 300 for subsequent propagation therealong. This drive pulse is chosen to be of such a level that it alone cannot provide a reverse domain in magnetic wire 300. However, if an input signal is received on one or more of the input lines at the time a drive pulse is applied to conductor 301, a stable reverse domain will be provided in the corresponding portions of magnetic wire 300. In this fashion information may be stored in the shift register comprising megnetic wire 300 by the simultaneous occurrence of input signals on drive lead 301 and one or more of the input lines. Subsequently, this stored information may be shifted along the wire 300 and out through sense conductor 302 by application of a succession of signals to the propagation conductors.

In FIGS. 2A–2C the magnetic wire of each domain wall propagation register is indicated as a rectangular block which is segmented to illustrate areas in which domains may be formed. The arrows directed to each particular segment correspond to the input lines in FIG. 3. Similarly, the input applied to one end of the register block corresponds to the propagation conductors and the output lead from the opposite end of the register block corresponds to sense conductor 302, FIG. 3. Drive conductor 301 is not illustrated in FIGS. 2A–2C, its operation being implied, for storage of information in each register block.

DATA INPUT AND OUTPUT REGISTERS

Data input register 210, FIG. 2A, receives information samples simultaneously from each of the twenty telephone lines in Group 1 during each frame interval by application of the output of the corresponding delta modulators such as 205 to particular assigned regions of register 210. Thus, upon each application of clock signal $t_2$ at the output of register 206, which in turn receives the output of delta modulator 205, a pair of coded signal samples from telephone 201 is stored in corresponding discrete regions of register 210. Since the output of a delta modulator is binary, we may presume that a "1" forms a reverse domain in the data input register, while a "0" will allow the magnetic wire to remain in its normal condition in that particular region to which the input is applied.

Advantageously in accordance with this embodiment of the invention, data input register 210 is divided into distinct sections so that it may accommodate a plurality of data samples retrieved from each of the corresponding delta modulators without increasing the propagate time. For this purpose a clock signal $t_7$ is applied simultaneously to the delta modulators to gate first signal samples into the short shift registers such as 206. A propagation signal $t_8$, applied thereafter, serves to move the stored signal samples by the space of one domain along register 206. The clock signal $t_7$ again is applied simultaneously to all of the delta modulators so as to gate second signal samples into register 206 in the regions previously occupied by the first signal samples. This process of alternate storage and propagation is repeated until the desired number of signal samples from each of the telephones have been stored. Thus, upon application to the delta modulators of two $t_7$ pulses in each frame, as indicated in FIG. 5 two samples from each of the twenty delta modulators in Group 1 are stored in the corresponding short shift registers, such as 206, and upon application of a $t_2$ clock pulse the content is gated simultaneously into corresponding locations in the two sections of data input register 210, thus storing a total of forty samples therein.

Upon completion of the storage operation, the stored information is propagated simultaneously through the two sections of register 210 by application of a sequence of clock signals $t_1$ during propagate interval $t_3$. These signals advantageously are applied simultaneously to both sections of the register at a rate which will clear the register before a new series of signal samples must be inserted. At the half megacycle bit shift rate $t_1$, two signal samples are received from each of the twenty telephone lines and stored in data input register 210, in two microseconds, thereby allowing a forty microsecond interval in which the twenty samples stored in each section must be shifted out of register 210. Thus propagation, in this instance at the half megacycle rate, will provide an overall frame of forty-two microseconds, FIG. 5. It may be appreciated, however, that the number of signal samples and the number of lines terminating on register 210 may vary according to system requirements, in which event the signal sampling and propagating rates will also vary accordingly.

The data input register may be directly connected to one end of the send path of common bus 105. For purposes of illustration, however, it is shown in FIG. 2A as a separate register connected to the send path via intermediate buffer registers 255, FIG. 2B, which in this instance permit a selection of signal samples from a maximum of four of the twenty lines in Group 1 for transmission to the central office. The selection process is described later in connection with activity register 220. However, it should be appreciated that propagation may be initiated, information may be inserted, and stored data may be extracted at any point or points along a domain wall shift register.

Data output register 215 is similar in operation to data input register 210. Data samples are taken from input transmission register 260 terminating the receive path of common bus 105 and applied in parallel to buffer registers 265, which in turn apply their outputs via leads 268 to the first domain in each section of data output register 215 upon receipt of a coincident signal from activity register 220, to be considered hereinafter. The stored samples are propagated through register 215 until they occupy a domain corresponding to the telephone line to which they are to be applied. Coincidence gates, such as AND gate 216, receive a stored sample from a domain in each section of register 215 and provide output signals upon the coincident receipt of a signal from a corresponding domain in activity register 220, to be considered hereinafter. The resultant is a parallel output of all information stored in data output register 215 and its subsequent application to the corresponding delta demodulators such as 207.

LINE SCANNER

Line scanner 230, FIG. 2A, serving twenty line Group 1 is of the type disclosed in the aforementioned Gianola et al. application. It comprises a pair of domain wall registers 231 and 232, the former being designated the present state register and the latter the last-look register. Present state register 231, as its name implies, stores the current condition of each of the twenty telephones in Group 1. Upon command, the content of present state register 231 is shifted serially into last-look register 232. In a succeeding cycle of operation, a new present state indication for each telephone is inserted in register 231 and, upon receipt of the next shift command, the contents of both present state and last-look registers are applied serially to exclusive OR circuit 233 which will provide an output only if a mismatch exists between its two inputs. Such a mismatch, of course, will indicate a change in the supervisory state of the particular telephone corresponding to the register content currently being observed.

In accordance with the particular timing sequence employed in this embodiment of the invention, the present state of each telephone in Group 1 is observed once during each 100 frames, or 4.2 millisecond, interval by the application of a pulse $t_1$ to AND gate 203 at the output of hybrid circuit 202, during the scan interval $t_4$ which occurs once during each 100 frames of forty-two microseconds duration. The telephones in the other four groups are also scanned in the $t_4$ interval.

Advantageously in accordance with this invention, the output of scanner 230 is utilized directly in the storage and transmission of the corresponding line number to the central office via the send path of common bus 105. Flip-flop 240 is set by a scan shift pulse $t_5$, applied once in each five frame interval, and its set output gates propagate signals $t_1$ through AND gate 241, which signals serve to step the two scanner registers 231 and 232. A change of state signal provided by exclusive OR circuit 233 resets flip-flop 240, thereby stopping the scanner propagation and triggering line number generator 245 to shift its current content through the corresponding AND gate 251 and OR gate 252 into a particular section of output transmission register 250 reserved for line scanning information.

In this fashion scanner 230 will continue to shift data until a change of state is encountered or until the 100 frame interval has elapsed. Also, having detected a change of state, scanner 230 stops, the corresponding line number is gated from generator 245 and renewed activity awaits the arrival of the next scan shift pulse $t_5$.

The exclusive OR gate 233 output signal is also applied to AND gate 242, which serves to apply a change of state indication for the corresponding line to generator 245. Thus if a service request is being initiated at a telephone, AND gate 242 will direct an output signal to generator 245 when the corresponding line number appears therein. If, instead, the telephone has just broken a service connection, AND gate 242 will fail to provide an output signal. This indication of the supervisory status of the telephone is applied to transmission register 250 by generator 245 along with the corresponding line number. In this fashion the central office and activity register 220, receiving this line number in this embodiment from the central office, will know immediately whether a request for service or a disconnect is indicated. In this instance, with 100 telephone lines terminating on concentrator 101, a seven-digit number will identify a line which has changed its supervisory state and one additional digit will indicate the type of change.

It may be noted that the output of AND gate 241, which propagates information through scanner 230, also drives line number generator 245 such that the proper line number is currently available to identify the line which has changed its supervisory state, as indicated by the output of exclusive OR circuit 233. The propagation of information through scanner 230 continues until either an output signal is provided by exclusive OR circuit 233 or a scan signal $t_4$ is applied to the reset input of flip-flop 240. The latter signal is also applied to line number generator 245 to reset the count to zero.

In summary, with five groups of telephone lines in concentrator 101 and with each group containing twenty lines, each scanner 230 will store twenty supervisory states. These states will be observed in sequence once per 100 frames of forty-two microseconds duration. Thus a change of state for any line will be detected and reported to the central office via the send path of bus 105 in a maximum interval of 4.2 milliseconds.

ACTIVITY REGISTER

Activity register 220, FIG. 2A, comprises a pair of domain wall registers 221 and 222 which circulate data indicating the supervisory state or activity condition of each telephone line terminating on the concentrator. Register 222 provides parallel outputs to AND gates 216 in conjunction with the outputs from data output register 215. If a particular line is active, the information being directed to that line through data output register 215 will be transmitted through the corresponding AND gates 216 upon appearance of signal $t_2$ and an activity signal from the corresponding domain or data storage region in register 222.

The activity condition of each of the twenty telephone lines in Group 1 is stored in activity register 220 and updated upon each change in supervisory state through the cooperative action of register 221 and comparison circuit 223. Thus each time a line identification is received in input transmission register 260 via the receive path of common bus 105, the identification digits are transmitted in parallel through AND gates 266 and cable 267 upon each appearance of the $t_2$ signal and stored in address register 224.

Address register 224 is arranged such that upon completion of the storage therein of the digits necessary to identify a particular telephone line, the corresponding address is applied to comparison circuit 223. Concurrently, line number generator 225 cycles through the numbers identifying each of the twenty telephone lines in Group 1 under control of signals received from AND gate 227. Such signals are provided during the propagate interval $t_3$ and correspond to the 500 kilocycle timing signals $t_1$. Thus all of the line numbers will be generated once in each frame interval and applied to comparison circuit 223 which, in turn, will provide an output when the number received from generator 225 matches the number received from register 224. This output is applied to a particular region in register 221. Activity conditions for the twenty lines in Group 1 are circulated through registers 221 and 222 at the same rate as line numbers are circulated through generator 225. Thus the timing is synchronized such that the region of register 221 receiving the output of comparison circuit 223 will correspond at that instant to the particular line number currently under comparison in register 223.

If a comparison is made, an activity indication will be stored in register 221 corresponding to the particular telephone line which has indicated a change in supervisory state from passive to active. Similarly, if an active telephone has just been restored to the passive state, comparison register 223 will apply a signal to register 221 which will erase the stored activity signal for that telephone line.

The output of register 221 which, as indicated, contains the activity status of all telephone lines terminating on the concentrator, is applied sequentially to register 222 for subsequent control of the output data applied to the telephone lines and is also directed via lead 226 to both buffer registers 255 and 265 transferring data to and from common bus 105. As indicated previously, the operation in the concentrtaor must be compatible with the central office which operates on a time division multiplex basis utilizing a distinct number of time slots in each frame interval for the transmission of information between active lines. Thus, although data is received in each frame from all telephone lines terminating on concentrator 101, it is only necessary and, indeed, expedient to transmit data from active ones of the telephone lines to the central office. Analysis of the traffic requirements in the particular concentrator would dictate the number of time slots which should be made available to accommodate the telephones lines terminating on the concentrator. In this instance, for example, with twenty telephone lines served by the Group 1 equipment indicated in FIG. 2A, four data time slots might be sufficient to provide an acceptable standard of service. This, of course, would permit five such groups of twenty telephone lines to provide data in parallel to output transmission register 250, FIG. 2B, terminating the send path of common bus 105 in order to fill the available complement of twenty time slots.

With four time slots, indicated as time slots 17–20, assigned to the particular group of twenty lines illustrated in FIG. 2A, activity register 220 would contain activity indications in four of the twenty domains of each of registers 221 and 222. As an activity condition reaches the output of register 221, it is applied to the propagate inputs of the duplicate sections of buffer register 255, FIG. 2B, and the particular items of data currently available from the corresponding active telephone line through data input register 210 will be shifted one position therein. During the interval between appearances of activity signals at the output of register 221, no information is propagated through buffer register 255 such that data provided by input register 210 during this interval will, in effect, be erased. At the end of each frame, the two sections of buffer register 255 will each contain four coded information samples, corresponding to the four time slots available to Group 1. These binary coded digits or bits are gated into corresponding positions in transmission register 250 at the beginning of each frame at $t_2$ for transmission to the central office via the send lead of common bus 105 at an increased bit shift rate in order to clear the register by the end of the frame.

The output of register 221 is also applied to the two sections of buffer register 265, FIG. 2C, which receive information in parallel from the receive path of common bus 105 at time $t_2$. Again, such information can only be transmitted to data output register 215 when an activity signal is received from register 221, thereby assuring that the proper region in data output register 215 corresponding to an active telephone line receives the particular data currently appearing in buffer register 265 from common bus 105.

PROCESSING A CALL

The operation of the system in establishing a connection between calling and called telephone lines located in the same concentrator will now be described, with particular reference to the concentrator facilities illustrated in FIGS. 2A–2C and the timing chart in FIG. 5. The subscriber at telephone 201–1 desires to place a call to the subscriber at telephone 210–1 and initiates the system operation by taking the telephone off-hook. Scanner 230 connected to the hybrid coil 202 in the line circuit of the calling line 201–1 signals the off-hook condition appearing as a voltage drop in the line circuit to a corresponding data storage region in register 231 during the scan interval $t_4$ occurring once in each 100 frames. As indicated heretofore, each of the telephone lines terminating on this concentrator will be observed during this scan interval $t_4$.

Scanner 230 having stored this off-hook indication in register 231, proceeds to shift the stored information into register 232 upon application of the scan shift signal $t_5$, serving to set flip-flop 240. Thereafter, each $t_1$ pulse applied to AND gate 241 will shift the stored information one position in registers 231 and 232. This, in turn, will cause corresponding regions in each of registers 231 and 232 to apply the stored information to exclusive OR circuit 233. A mismatch will occur when the present state and last-look regions of registers 231 and 232, corresponding to the calling line, are read out of registers 231 and 232. Exclusive OR circuit 233 will thus provide an output to reset flip-flop 240 at this time. The same output will trigger line number generator 245 to direct the number corresponding to the calling line in parallel form via cable 246 to a discrete region of output transmission register 250 through Group 1 AND gate 251 and OR gate 252 upon appearance of the $t_{G1}$ signal. It should be noted, however, that merely reporting the line identity is insufficient to inform the central office as to the type of supervisory change which has occurred. In order to accomplish this result, AND gate 242 is included in scanner 230 and serves to insert an additional bit in the output register of line number generator 245 whenever the particular line under surveillance is changing from the on-hook to the off-hook condition. It may be noted in this regard that a change from one-hook to off-hook places an information bit in the corresponding region of present state register 231 in scanner 230. Thus the output of present state register 231, together with a mismatch indication from exclusive OR circuit 233, will enable AND gate 242 to provide an output signal indicating this particular change of state. If, however, the change of state to be reported is from the off-hook or active condition to the on-hook or passive condition, a data bit will not be stored in present state register 231, but it will be found in the corresponding region of last-look register 232. Thus an output for this particular line will be derived from exclusive OR circuit 233, which output coupled with an input from present state register 231, will fail to enable AND gate 242, and the data bit stored in line number generator 245 will be indicative of this change of line condition. This supervisory data bit may precede or succeed the line number for which it indicates the supervisory state in its transmission to the central office where it is treated accordingly by marker 60.

When the central office has identified the particular line indicating a change of state and the type of change involved, the line number and supervisory bit are returned to the concentrator on the receive path of common bus 105 by line number memory 20. If the supervisory bit, reaching activity register 220 via input transmission register 260, AND gates 266 and cable 267, indicates a change from on-hook to off-hook has occurred when telephone 201–1 initiated the call to telephone 210–1, comparison register 223 will be permitted to insert an activity indication in the region of register 221 corresponding to telephone 201–1.

The number identifying the calling line 201–1, together with the change of state indication, thus will be transmitted from output transmission register 250 during the propagate interval $t_3$ and over the send path of common bus 105 to marker 60 in central office 100, FIG. 4. Receipt of this number initiates action in marker 60 to assign the calling line to a particular time slot and to register the calling line designation in the assigned time slot in line number memory 20 where it will be circulated for the duration of the call. In the process, marker 60 marks this particular time slot as busy and transmits dial tone over the receive path of common bus 105 from tone system 70 through signaling and tone gate 71 in the assigned time slot. This data is transferred to data output register 215 via buffer registers 265.

In addition, line number memory 20 applies the calling line number to the receive path in the supervisory portion of the transmission frame. This line number will be transferred to activity register 220 during a subsequent $t_2$ interval. The calling line number will be compared with the Group 1 numbers contained in generator 225 during the propagate $t_3$ of the same frame and when a match occurs, the activity signal will be transmitted from comparison circuit 223 to register 221. Thus the calling line is registered as being active in activity register 220.

This activity indication is circulated through register 222 and, upon appearance of the next $t_2$ interval, a pair of output AND gates 216 will conduct samples of the coded dial tone from data output register 215 to short shift register 217. The $t_7$ pulses will transfer the stored signals to delta demodulator 207. Upon hearing dial tone, the calling party begins dialing the directory number of called telephone 210–1. The changes in line condition caused by the dial operation are coded in delta modulator 205 and stored in short shift register 206 at the rate of two samples per frame during the propagate interval. They are then stored in corresponding discrete regions of the two sections of data input register 210 during the next data insert interval $t_2$. During the following propagate interval $t_3$, this stored information will be shifted over output leads 211 and inserted in buffer register 255 in the respective assigned time slots, as determined by the appearance of the activity indication at the output of register 221 on lead 226 during the same frame. Subsequently, in interval $t_2$, the samples are gated in parallel to transmission register 250 from which they are transmitted at an increased rate to the central office.

These dial pulse signals are received in supervisory circuit 50 at the central office 100 and processed in a manner described in detail in the aforementioned Inose et al. patent. Having completed the storage of the dialed digits identifying the called line, a busy test of the called line is conducted. For this purpose, the dialed digits stored in supervisory register 80 are transmitted to marker 60 where the designation of the called line is compared with the information stored in line number memory 20 and if such a comparison reveals that the called line is not stored therein, marker 60 proceeds to assign a time slot to the called line and to store the called line designation in line number memory 20. Marker 60 now has available indications of time slots assigned to the calling and called lines and proceeds to transmit this information to pulse shifter memory 45, which in turn prepares to activate pulse shifter 40 in successive frames while the connection between the calling and called lines is active.

Having assigned an idle time slot to the called line, tone system 70 provides ringing tone to the called line via signal and tone gate 71 and the receive path of common bus 105 in the assigned time slot. Tone system 70 provides the same tone to the calling party in the time slot assigned to the calling line such that both parties will hear the same tone in the time slots assigned to their respective lines.

The supervisory circuit 50 now observes the status of the called line in its assigned time slot and, when the off-hook condition is detected, the various control circuits involved in establishment of the call connection including marker 60, supervisory 50 and register 80 are restored to normal. Voice transmission on the active connection is maintained by virtue of the activity indication stored in activity register 220 for the respective calling and called lines, such that each bit of information received from the central office via common bus 105 in the time slot assigned to the calling or called line will be directed to the appropriate line from output data register 215 by virtue of the activity indication contained in register 220.

Supervisory circuit 50 continues to monitor the active connection. When the connection is broken by the calling or called party, scanner 230 will detect the change in supervisory condition of the line from off-hook to on-hook and transmit the identifying number and type of transition to central office 100 in the manner described earlier for the calling telephone going off-hook. After processing, the central office returns this data to concentrator 101 where it is received in activity register 220. In this instance comparison register 223 will apply an opposite signal to register 221 in order to erase the activity signal present therein corresponding to telephone 201–1. This is the only action required at the concentrator upon hang-up by either party to the conversation.

It may be appreciated that because the telephone line and the supervisory condition currently affecting that line are completely identified and reported by the concentrator to the central office, elaborate means for separating information and control signals and identifying particular control signals at the central office will not be required in the instant arrangement. It may be appreciated also that should the called line be busy during the establishment of the aforementioned call connection, the various control operations at the central office in the aforementioned Inose et al. patent will be sufficient to satisfy the requirements of the instant system. Thus with called telephone 210–1 busy on a previous call connection, an activity signal will be present in the activity register corresponding to telephone 210–1, which condition will not be disturbed inasmuch as the busy condition will first be detected at the central office. Busy tone will be transmitted from tone system 70 to calling telephone 201–1 via the receive path of common bus 105 in the corresponding assigned time slot in the manner described for dial and ringing tone, indicating the detected busy condition of the called telephone.

Upon disconnect by calling telephone 201–1, hybrid circuit 202 and AND gate 203 will transmit the change of state signal to scanner 230 during the next scan interval $t_4$ and the process of transmitting the calling line identifying number plus the supervisory bit, indicating an off-hook to on-hook transition to the central office will be repeated. Marker 60 will detect the line number and transition indication and take appropriate steps to erase the time slot assignment for telephone 201–1. Subsequently, the line number and transition bit will be transmitted to the concentrator from line number member 20 via the receive path of common bus 105 and the comparison process will be repeated, resulting in the ultimate erasure of the activity indication from the region corresponding to telephone 201–1. Thus all of the equipment pertaining to this particular call is restored to normal.

It is to be understood that the above-described arrangements are merely illustrative of the application of the principles of the invention. Numerous other arrangements may be devised by those skilled in the art without departing from the spirit and scope of the invention.

What is claimed is:

1. A communication system comprising a plurality of lines, common bus means, and means for communicating coded information samples between active ones of said lines and said bus means comprising means for transferring samples simultaneously from more than two of said lines to said bus.

2. A communication system comprising more than two lines, common bus means for communication transfer with active ones of said lines, and means for transferring samples of coded information simultaneously between each of said lines and said bus means in repetitive time intervals.

3. A communication system comprising a plurality of lines, common bus means including a transmission register, and means for transmitting coded information samples from said lines to said bus means, said transmitting means including means for receiving a plurality of information samples in sequence from one of said lines and for transferring said samples simultaneously to corresponding discrete locations in said transmission register.

4. A communication system comprising a plurality of lines, a common bus having a pair of paths for transmission in opposite directions, each of said paths comprising register means, means for transferring data simultaneously from each of said lines to said register means in one path, and means for transferring data simultaneously from said register means in said other path to said lines.

5. A time division communication system comprising a plurality of lines, a common bus, means for transmitting data sequentially over said common bus during repetitive frames, means for receiving a data sample from each of said lines in a distinct time interval intermediate said frames, and means for introducing selected ones of said received data samples to discrete positions in said common bus corresponding to time slots in said repetitive frames in said distinct time interval preceding transmission of each frame of data.

6. A time division communication system in accordance with claim 5 and further comprising means for removing data samples from said common bus during said distinct time interval for simultaneous transmission to active ones of said lines.

7. A time division communication system comprising a pluraltiy of lines, a common bus, means for transmitting data sequentially over said common bus during repetitive frames, means for receiving a data sample from each of said lines in a distinct time interval, means samples to discrete positions in said common bus corresponding to time slots in said repetitive frame in said distinct time interval preceding transmission of each frame of data, wherein said introducing means comprises a data register, an activity register indicating only those lines currently in an active state, a buffer register, means for applying the content of said data register in sequence to said buffer register, means for propagating data along said buffer register, means for applying the content of said activity register sequentially to said propagating means in the distinct time slots of said repetitive cycle, and means for transferring the content of said buffer register in paralle to said common bus.

8. A communication system comprising a plurality of lines, a common bus for transmitting information to and from active lines, means for scanning said lines for service requests and means responsive to detection of a service request for transferring a designation of the requesting line to said common bus, said scanning means comprising a scan register and means for applying a supervisory status indication from each of said lines simultaneously to said scan register.

9. A communication system in accordance with claim 8 and further comprising means for generating repetitively a sequence of numbers to identify each of said lines in a repetitive cycle and means responsive to receipt in said generating means of a request for service indication from said scanning means for gating the corresponding line number and an indication of the type of service request to said common bus.

10. A communication system comprising a plurality of lines, a common bus for transmitting information to and from active ones of said lines, means for scanning said lines for service requests, means responsive to detection of a service request for transferring a designation of the requesting line to said common bus, an activity register indicating only those lines currently in an active state, means for generating repetitively a sequence of numbers to identify each of said lines, means for comparing the content of said line number generating means with the line number designation being transmitted over the common bus and means operative upon detection of a comparison for applying the output of said comparing means to said activity register.

11. A communication system comprising a plurality of lines, a common bus for transmitting information to and from active lines, means for scanning said lines for service requests, means responsive to detection of a service request for transferring a designation of the requesting line to said common bus, an activity register indicating only those lines currently in an active state, means for generating repetitively a sequence of numbers to identify each of said lines, means for comparing the content of said line number generating means with the line number designation being transmitted over the common bus, means operative upon detection of a comparison for applying the output of said comparing means to said activity register, an output register, means for applying information being transmitted over said common bus to said output register, and means operative in conjunction with said activity register for applying the content of said output register simultaneously to each of said active lines.

12. A communication system comprising a plurality of lines, a common bus, and means for exchanging data among active lines comprising transferring means for receiving a sequence of data samples from each of said lines and for transferring said data samples simultaneously to said common bus.

13. A communication system in accordance with claim 12 wherein said transferring means comprises coding means, first register means for each of said lines for storing a plurality of samples from said coding means and second register means common to said lines, said second register means including individual register means equal in number to the number of said plurality of samples.

14. A communication system in accordance with claim 12 and further comprising means for propagating data samples only from selected ones of said lines along said common bus.

15. A communication system comprising a plurality of lines, a common bus, means for transferring a sequence of signals from each of said lines to said bus simultaneously, and means for propagating only selected ones of said transferred signal sequences along said common bus.

16. A communication system comprising a plurality of lines, a common bus for transmitting data to and from said lines, means for transferring data samples on said lines to said bus and means for propagating only selected ones of said transferred data samples along said common bus, said common bus comprising a data input register, said data samples being transferred simultaneously from each of said lines to corresponding discrete locations in said data input register.

17. A communication system in accordance with claim 16 wherein said propagating means comprises an activity register, means for recording an activity indication in a discrete portion of said activity register corresponding to each active line, and means for applying said recorded activity indications in sequence to said common bus to propagate the data samples transferred from the corresponding lines along said common bus.

18. A communication system comprising a plurality of lines, a common bus for transmitting data to and from said lines, means for transferring data samples on said lines to said bus, means for propagating only selected ones of said transferred data samples along said common bus, an activity register, means for recording an activity indication in a discrete portion of said activity register corresponding to each active line, means for applying said recorded activity indications in sequence to said common bus to propagate the data samples transferred from the corresponding lines along said common bus, a data output register, means for inserting data samples received from said bus in corresponding discrete locations in said data output register, and means including said activity register for applying the data samples contained in said data output register simultaneously to the corresponding active lines.

19. A communication system comprising a plurality of lines, a common bus for communicating interchanging data with said lines, and means for scanning said lines for service requests comprising means for receiving an activity indication simultaneously from each of said lines, and means for applying the designation of a requesting line to said common bus.

20. A communication system in accordance with claim 19 wherein said applying means comprises a line number generator containing a designation of each of said lines and means for transferring a line designation from said line number generator when the condition of the designated line as recorded in said receiving means indicates a request for service.

21. A communication system in accordance with claim 20 further comprising an activity register containing an activity indication in positions corresponding to each active line, means for comparing the designation of a line requesting service as contained in the common bus with the line designations corresponding to the content of said activity register, and means responsive to a match for inserting an activity indication in said activity register corresponding to said designated line.

22. A communication system comprising a plurality of lines, common bus means, register means, means for simultaneously transferring data samples from all said lines to said register means, and means for transmitting data samples from only active ones of said lines over said common bus means in distinct time periods.

References Cited

UNITED STATES PATENTS

| | | | |
|---|---|---|---|
| 3,166,734 | 1/1965 | Helfrich | 179—15 |
| 3,206,553 | 9/1965 | Lucas et al. | 179—18 |
| 3,271,521 | 9/1966 | Von Sanden et al. | 179—15 |
| 3,308,240 | 3/1967 | Von Sanden | 179—15 |
| 3,306,979 | 2/1967 | Ingram | 179—15 |
| 3,311,705 | 3/1967 | Le Corre et al. | 179—15 |

KATHLEEN H. CLAFFY, Primary Examiner

A. B. KIMBALL, Jr., Assistant Examiner

U.S. Cl. X.R.

179—18